June 4, 1963  G. B. FOSTER  3,092,724

MASS DISTRIBUTION ANALYZER

Filed July 27, 1959

Inventor
George B. Foster
By Anthony D. Cennamo

United States Patent Office 3,092,724
Patented June 4, 1963

3,092,724
MASS DISTRIBUTION ANALYZER
George B. Foster, Worthington, Ohio, assignor to Industrial Nucleonics Corporation, a corporation of Ohio
Filed July 27, 1959, Ser. No. 829,668
3 Claims. (Cl. 250—83.3)

This invention relates in general to a material measuring system for an industrial process and specifically to method and means of utilizing the absorption techniques of radiation instrumentation for determining the mass distribution of the material examined.

The term "mass distribution" refers to the relative evenness of the distribution of the particles making up the material within the measured area under examination. Thus a relatively few large dense lumps of matter may contain the same amount of mass as a smoothly distributed foam containing the same amount of matter.

The invention described herein teaches a non-destructive method and means of making observations on the relative evenness of distribution of the mass of matter in a material in comparison with material of standard characteristics.

The use of radiation sources and detectors to obtain information on the absorption characteristics of examined material is well known. However, one difficulty in the practice of radiation instrumentation is the retention of accurate readings in accordance with a previously performed calibration when the mass distribution of the material examined is different from that of the material which was employed for calibration purposes. Depending upon the nature of the radiation corpuscles or photons these aberrations in readout become more or less serious as a function of the energy of the incident radiation. That is to say, if other considerations permitted it, and if appropriate radiation sources were available, these effects on the accuracy of the equipment, due to variations in the mass distribution in the material, can be minimized by making the radiation energy relatively high. The use of high energy radiation tends to make the absorption function of radiation directed toward a sample more nearly linear than when a low energy of radiation is used. In the ordinary case, however, these high energies cannot be employed because of the adverse effects on signal to noise ratio in the measurement system. Some of the factors governing the selection of source energy have been pointed out by A. M. Bogachev et al., in "Measuring Thickness and Density by Means of Radioactive Isotopes" (Academy of Sciences USSR Conference on Peaceful Uses of Atomic Energy, 1955). The selection of the optimum energy radiation source for measurement of a particular thickness of sample is governed by apparatus errors, potential environment errors and by the effects of statistical fluctuation of the source decay rate. As a consequence it is customary for gauge designers to utilize radiation source of appropriate energy to minimize the errors cited above and to resort to multiple calibrations corresponding to different mass distributions of the measured material, when such variations in mass distribution are encountered.

Many applications of an inspection system for determining the mass distribution of the material examined are feasible. One application is the inspection during manufacture of the effectiveness of a filter element which is to be used to remove particles from a gas or liquid stream. In filter elements used in forced air heating plants, for example, the distribution of the fibrous materials of the filter is of great importance. If the mass distribution of this material is very uneven the gas to be filtered will largely pass through open areas, while avoiding bunched concentrations of fibers. This will cause impaired filtration efficiency. Similar conditions apply in the filtration of liquids. Another application of the principles taught herein is the continuous inspection of the particle size of suspensions, slurries or dry compactions, such as occurs in mineral reduction operations. These are eminently practical by the methods taught herein. Still another application is the measurement of the uniformity of weave of textile materials; this can be readily accomplished by the radiation techniques described herein. A further example is the detection of "fines" in dry screened materials. These can be readily detected by these techniques. Many other applications are immediately apparent to those schooled in industrial problems.

The present invention makes use of the sensitivity of radiation absorption devices to the mass distribution of the examined material. The effective absorption of incident radiation by examined material is greater as the distribution of the mass of the material is the more uniform. This effect occurs to greater or less degree in proportion to the energy of the radiation used. This sensitivity to the uniformity of the mass distribution is a consequence of the exponential nature of the response in a radiation detector to the radiation transmitted through varying amounts of mass in a measured material. In a typical embodiment, this sensitivity is employed to determine the uniformity of the distribution of the mass of the material being examined. This is accomplished through the observation of the degree of absorption occurring in the measured material when subjected to radiation of significantly different energies. In an illustrative embodiment, two radiation source-detectors having significantly different energies of radiation are used for the observation of the transmission/absorption characteristic of material when these have been calibrated over a range of values of mass per unit area with a material of a particular distribution of mass and given composition. Such material will then read out the same value of mass per unit area in the two gauging channels of different energies. These channels will read different values of apparent mass per unit area when the examined material varies significantly in its mass distribution characteristic from that of the material used in the original calibration. The degree of divergence in their respective indicated values of mass is a function of the degree of departure of the uniformity of mass distribution in the measured material from the distribution existing in the material used for calibration. The lower energy channel will be affected to a greater degree than will the higher energy channel. The useful output from the inspection device relies on the difference in the degree to which the two channels are affected by the change in mass distribution of matter in the examined material.

In further explanation of the term "mass distribution uniformity," it is used herein in reference to the macroscopic and gross variations, with location of the projected cross-section area, in the amount of matter per unit of said area as presented to the incident beam of radiation and the resulting radiation flux received at the detector. Thus in a material of regular pattern, such as a woven textile, the maximum "uniformity" occurs when the threads lie at regular intervals of warp and woof and in firm contact between each thread and its neighbor. As the threads or yarn become bunched and gaps between them develop the distribution of the mass of the material is thus more non-uniform. Likewise, in random material orientation, such as occurs in glass fiber air filter elements, the maximum uniformity results in a minimum of variation of mass cross-section from one area to the next. As the fibers become bunched or depart from randomness in the direction of their "lay,"

concentrations of mass occur and consequent relatively "open" areas develop.

Accordingly, the principal object of the present invention is to provide method and means for determining the mass distribution of material being produced in an industrial process.

Another object of the present invention is to provide method and means for obtaining readings of the mass distribution of a material relative to a single calibration of the gauging apparatus.

Another object of the present invention is to provide a means of compensating the indicated value of mass per unit area from a gauging device so that errors do not arise when the mass distribution of the material examined departs from that of the material used for calibration.

A further object of the invention is to provide an accurate radiation measuring system that does not lessen the signal to noise ratio and which does not require an increase in the radiation source size.

Other objects and features will become apparent from the following detailed description when taken in conjunction with the drawings in which.

Figure 1:
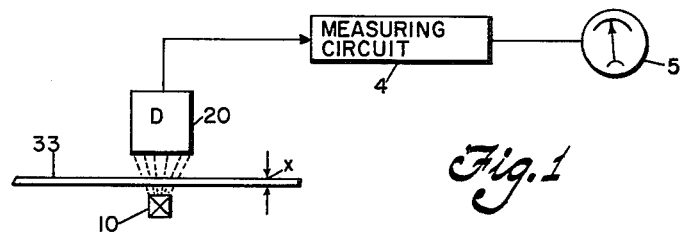
FIGURE 1 is a simple block schematic illustration of a nuclear measuring and indicating system and FIGURE 1a is a graph illustrating the absorption response of the system.
Figure 1A:
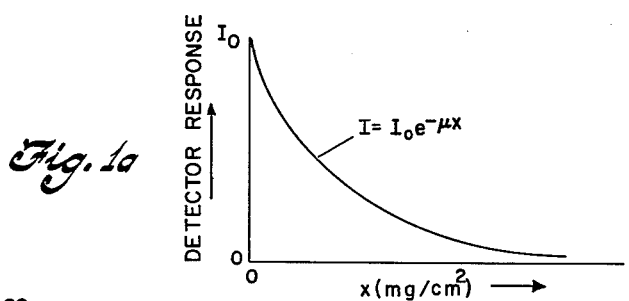

When radiation is directed at a material and detection means are used to observe the relative loss of radiation flux caused by the placement of material between the radiation source and the detector, the loss of radiation flux is observed in FIG. 1a to occur in a more or less exponential manner. The loss of radiation flux at the detector is a function of the effective mass cross-section of the measured material, the distribution of its mass in the area subjected to the radiation, and the nature of the incident radiation. For material which is evenly distributed throughout the measured area the radiation flux absorption function has the general form $$I = I_0 e^{-\mu x}$$

where $I$ is the radiation flux intensity existing after passage through the material
$I_0$ is the unattenuated flux intensity
$x$ is the average mass cross-section of the material
$\mu$ is the mass absorption coefficient pertaining to the measured material and the nature of the radiation.

The total radiation transmitted through material is determined by the degree of absorption suffered by the incident radiation in each of the differential local areas of the sample. The flux transmitted through each of the local areas of a material of uniform mass distribution will be identical to each other, and the total flux transmitted is the sum of each of these local area transmittances. Thus, at a particular energy of radiation which has a corresponding value of mass absorption coefficient $\mu_1$ for material of a given composition and uniform mass distribution:

$$I_A = I_{10}\left[\frac{e^{-\mu_1 x_1} + e^{-\mu_1 x_2} + e^{-\mu_1 x_3} \ldots + e^{-\mu_1 x_n}}{n}\right] \quad (1)$$

where $I_A$ is the radiation flux intensity received at the detector, $I_{10}$ is the unattenuated value of flux and $x_1$, $x_2$, ... $x_n$ are the local mass per unit area values of the $n$ differential areas making up the total sample area.

However, if a quantity of mass $\Delta x$ is transferred from an area having a weight per unit area $x_1$ to an area having a weight per unit area $x_2$, then the mass distribution becomes non-uniform and the transmitted radiation flux will be:

$$I_{A_1} = I_{10}\left[\frac{e^{-\mu_1(x_1-\Delta x)} + e^{-\mu_1(x_2+\Delta x)} \ldots + e^{-\mu_1 x_n}}{n}\right] \quad (2)$$

The degree of absorption suffered by the incident radiation is now less than in Equation 1 and $I_A \neq I_{A_1}$. Therefore, $$I_{A_1} - I_A \neq 0 \quad (3)$$

even though the total value of $x$ remains the same.

A similar treatment for a second energy of radiation having a different value of mass absorption coefficient $\mu_2$ yields the result that the transmitted radiation flux $I_B$ is again different for the two types of mass distribution:

$$I_B = I_{20}\left[\frac{e^{-\mu_2 x_1} + e^{-\mu_2 x_2} + e^{-\mu_2 x_3} \ldots + e^{-\mu_2 x_n}}{n}\right] \quad (4)$$

$$I_{B_1} = I_{20}\left[\frac{e^{-\mu_2(x_1-\Delta x)} + e^{-\mu_2(x_2+\Delta x)} \ldots + e^{-\mu_2 x_n}}{n}\right] \quad (5)$$

Therefore, $$I_{B_1} - I_B \neq 0 \quad (6)$$

The intelligence is contained in the quantity resulting $$(I_{A_1} - I_A) - (I_{B_1} - I_B) = R.H. \quad (7)$$

where R.H. is a factor proportional to the degree of departure of the material from the mass distribution of the material used in the calibration of the two measurement channels. Since the effect here thus depends upon the differences brought about by the different values of mass absorption coefficient $\mu$ between the two measurement channels this difference in $\mu$ should be maximized within the limits of practical considerations later discussed.

An effect of the non-linearity of the absorption function is that a gauging device such as shown in FIG. 1 which comprises a radiation detector so disposed to receive radiation from a radiation source 10 through sample material 33, the measured response from circuit 4 and indicated on indicator 5, will be responsive essentially to transmittance of the material to the incident radiation, where such transmittance is the reciprocal of the fraction of incident radiation absorbed. Such an apparatus is calibrated for a given degree of mass distribution in the sample material. If the composition remains fixed but the mass distribution of other materials inserted in this calibrated system differs from that which existed in the material used for the original calibration an error in indicated value of mass per unit area will result. In other words, if one starts with a sample of uniform mass distribution, and a radiation detector calibrated specifically for it, then if the mass of the material shifts to a more uneven mass distribution, the radiation signal received at the detector is decreased less in the piled up areas than it is increased in the valleys or thin spots. The result is that the unevenly distributed material passes more radiation. And the more uneven or lumpy the sample the more radiation it transmits for the same average mass per unit area and same chemical composition of the material.

Figure 2:
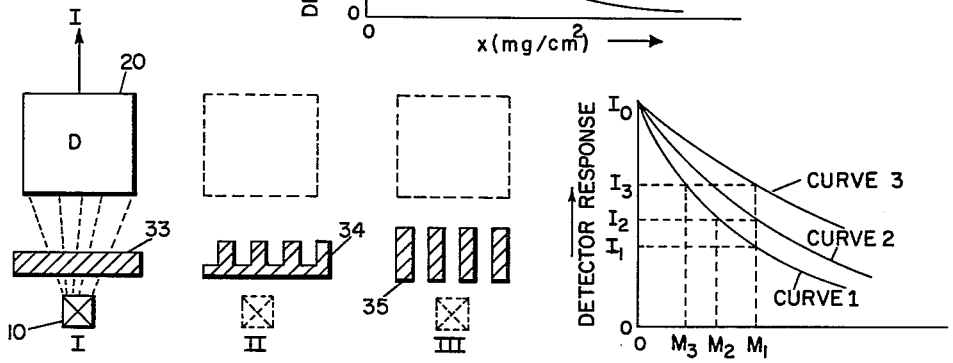
FIGURE 2 is intended to illustrate type material for test in a measuring system having different mass distribution and FIGURE 2a illustrates the absorption characteristics of the varying material and FIGURE 3 is a block schematic illustration of a preferred embodiment of the present invention and FIGURE 3a is a circuit schematic of a typical ratio computer.
Figure 2A:
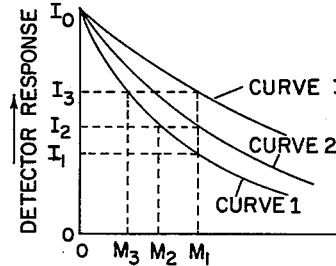

The cross-section sketches labeled I, II and III, of FIGURE 2, represent three possible mass distributions of material 33, 34 and 35 having the same average mass per unit area. The curves in FIGURE 2a represent the response in the detector 20 which is receiving radiation from the source 10. These curves show the increasing degree of absorption which occurs with increasing mass of material 33, 34 and 35 when they are placed in the measuring gap. Assume that an initial calibration of the radiation gauging device has been made for material of uniform mass distribution as shown in type I (33). The resulting calibration is represented in curve 1 of FIG. 2a. This calibration will then permit the detector response $I$ to correctly be interpreted in terms of the value of average mass per unit area of material inserted in the measuring area. However, this calibration is accurate only for type I material (33). To illustrate, let a sample of type I material, such as material 33, of average mass/unit area equal to $M_1$ be inserted in the measuring gap. Let the detector response be $I_1$. The instrument having been calibrated for type I material (i.e. of uniform mass distribution) will now accurately interpret the output current $I_1$ as indicating the mass $M_1$ of sample. Now if a sample of the same mass/unit area but of mass distribution type II is inserted between the source 10 and detector 20 a value of detector response $I_2$ is obtained. The resulting indicated value of material mass $M_2$ in terms of the original calibration would thus be in error, since the true value of mass of the type II material is identical with the first sample. The true value $M_1$ thus lies on a different calibration curve corresponding to the different distribution of mass in the type II material (34). A curve of calibration for such type II material is shown as curve 2. On curve 2 the electrical response $I_2$ corresponds to the true value of mass per unit area $M_1$ of this type II material. That is to say, curve 2 is a true and accurate calibration for the type II material and the true mass per unit area value of the sample is read accurately in terms of $I_2$ on the calibration curve 2. Likewise, if a sample of mass distribution type III, which has a mass per unit area equal to $M_1$, as in the two previous samples, is now placed in the measuring gap, a detector response $I_3$ is obtained. This indication of mass as read in terms of curve 1 would again be in error. A mass value of $M_3$ would be indicated. The true value of mass would lie on curve 3, at the value $M_1$. This could again be accurately determined if the instrument were to be calibrated for curve 3 corresponding to the type III material (35).

The initial calibration need not have been carried out with the uniform material which resulted in curve 1. Calibration can be carried out with material of any degree of unevenness of mass distribution. An illustration might be material of type II, representing material of average characteristic. In fact, radiation instruments of this class generally are so calibrated, because of the difficulty of finding material of mass distribution type I, and the fact that a calibration carried out with material of average degree of unevenness can be used for useful mass per unit area measurements of samples whose unevenness is more or less similar to the calibrating material. Since $I_1$, $I_2$, $I_3$ are in the order of decreasing indicated mass, it is seen that as the mass distribution of the measured material departs toward greater evenness the indicated mass is greater than the calibrated value and as the distribution departs toward greater unevenness the indicated value of mass becomes less.

While this effect can be minimized by the use of the highest energy radiation source practicable, it cannot be eliminated. This is both by reason of the exponential nature of the radiation absorption function and the resulting limitations on signal to noise ratio in the measuring apparatus and the difficulty of generating such penetrating radiation. Conversely, the effect can be magnified by employing a source of radiation of the lowest possible energy which will still be responsive to changes in the mass per unit area of the measured material in the regions of the sampled area having the highest local value of weight per unit area. By comparing the outputs of two detection means, their indicated mass readings will depart one from the other as the degree of heterogeneity of the material departs from that used in calibration, i.e., for which they read the same values of mass per unit area as sample mass per unit area is varied.

Figure 3:
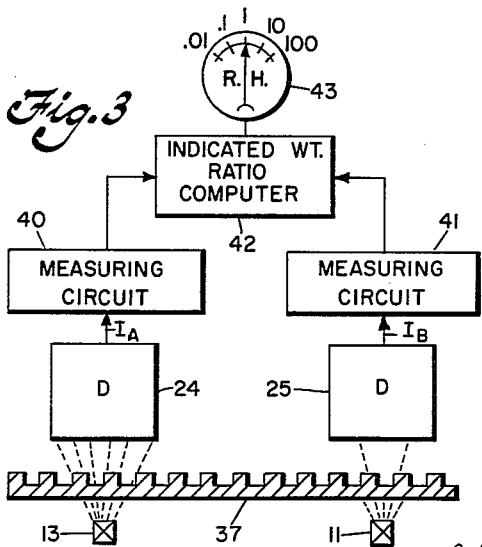

In FIGURE 3 there is shown a preferred embodiment of the invention which comprises a high energy beta emitter 13, such as Sr–90, and a low energy beta emitter 11, such as Kr–85; detectors 24 and 25, which may be ionization chambers, each adapted to respond in a known manner to the radiation emanating from its respective source; the measuring circuits 40 and 41, which are commercially available, such as those disclosed in U.S. Patent No. 2,790,945 to H. R. Chope. The apparatus further comprises the computer 42, designed to respond to the outputs of the measuring circuits 40 and 41 and to render at its output a voltage indicative of the ratio of indicated values of mass per unit area from the two measuring channels.

Figure 3A:
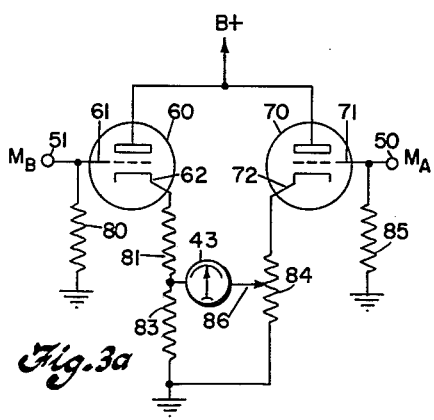

This computer could be a differential cathode follower responding to the analog voltage outputs from the measuring channels. A circuit such as shown in FIGURE 3a will perform this operation. The voltage $M_A$, representing the indicated value of mass per unit area from measuring channel A, is applied at the grid input 50. Likewise the voltage $M_B$, from channel B, is applied to the grid input 51.

The "balance" control 86 is previously adjusted to produce a zero current reading in the indicator 43. This adjustment is made with the voltages $M_A$ and $M_B$ temporarily set at zero or these inputs otherwise disconnected from the inputs 50 and 51.

Then as the voltages $M_A$ and $M_B$ rise and fall in accordance with their respective measurements of the mass per unit area of the material being examined, the indicator 43 will remain in the balance position provided that the indicated values of mass from each channel remain the same.

The units of readout on the indicator are relative uniformity with respect to the mass distribution of material existing in the samples used for weight calibration of the two channels. Let channel A be the higher energy channel and channel B be the lower energy channel, in accordance with the radiation source energies discussed above. As the material becomes more homogeneous the indicator 43 will deflect in response to the cathode 62 decreasing to a lower voltage than cathode 72. This is a consequence of the voltage $M_B$ being affected to a greater degree than $M_A$ as the material becomes more uniform. That is to say, the indicated mass becomes greater in both channels and the change in indicated mass is greater in the low energy channel than in the high energy channel. However, the effect here depends on the difference in the degree to which the two channels were affected, since both channels are affected by the change in mass distribution occurring in the sample.

The units of indicated degree of homogeneity are likely arbitrarily selected as convenient to the user. The primary reference is the balance point existing when material of standard characteristics is employed as in the original calibration. By suitable switching means the instrument could be preset for a plurality of materials of varying mass distribution characteristic.

One arrangement could define the relative mass distribution of material as unity (1.0) when the material has the same characteristic as that used for calibration. This scale reading corresponds to the balance point when $M_A = M_B$ at the inputs to the "indicated weight ratio computer" 42. Then as the material becomes more heterogeneous the indicator could read higher values of relative heterogeneity and as the material becomes more homogeneous the indicator could read lower, decimal values of relative heterogeneity. Thus the scalar reading is the value of heterogeneity of the examined material relative to the material of standard characteristic used in calibration.

$$RH = \frac{M_A(\text{indicated value of mass, Channel A})}{M_B(\text{indicated value of mass, Channel B})}$$

A scale representing such values is depicted on the face of the indicator 43 (FIGURE 3).

While the illustration above is confined to the use of two beta radiation sources, the technique is equally applicable to radiation sources of other qualities. The criterion for selection is that the low energy source should still be responsive to changes in mass at the heaviest weight encountered, and the high energy sources should exhibit sufficient absorptivity in the measured material to permit measurement at adequate signal to noise ratio.

In the case of X-ray and gamma sources the instrumentation will likewise be responsive to the relative heterogeneity (of mass distribution) factor as described above. Low energy X-radiation and gamma emissions will exhibit sensitivity to changes in composition to greater degree than will apparatus employing beta emitters. This difficulty, however, can be readily overcome by an appropriate number of calibrations in accordance with the variations in material composition encountered.

Further, the measuring system disclosed herein is applicable to a single channel configuration wherein the source of radiation is varied in energy between two or more discrete energies or is varied in a continuous sweep between two limits of energy. One such limit might be zero. The degree of absorption noted at these discrete energies or over the sweep of energies is then related to the degree of relative mass distribution by the methods taught herein.

A further embodiment of this measuring system can comprise a plurality of source detector combinations constituting additional channels beyond the channels A and B, discussed previously. Thus the channels C, D, E . . . N would be operative. These channels differ from each other in that they have increasing degrees of radiation penetrability. Thus at low values of mass per unit area of examined material the value of relative heterogeneity would be read from the ratio of channel A to channel B. As the mass of the measured material increased such that channel A was no longer effectively responding to changes in the mass of the measured material the instrument would become responsive to the ratio of channel B to channel C, etc.

Although I have shown certain and specific embodiments, it should be understood that several changes, additions and omissions may be made therein without departing from the spirit and scope of the present invention or sacrificing any of its attendant advantages.

I claim:
1. The method of measuring independent of variations in the mass per unit area the relative uniformity of mass distribution in a material of substantially constant chemical composition, which comprises irradiating a sample of said material having a standard uniformity of mass distribution with a first and a second radiation having mutually different characteristics, detecting the intensity of said radiations emanating from said sample, generating an electrical signal indicative of said detected intensity of said first radiation, generating another electrical signal indicative of the detected intensity of said second radiation, recording the ratio of said signals; replacing said sample with a material having an unknown uniformity of mass distribution and of substantially the same mass per unit area and substantially constant chemical composition as said sample, irradiating said material of unknown mass uniformity with said first and second irradiation having mutually different characteristics, detecting the intensity of said radiation from said sample, generating first and second electrical signals from said detected radiation, and deriving a ratio from said first and second signals; comparing said sample ratio with said last named ratio, and indicating any change in said ratio as representative of a change in the uniformity of the mass distribution of said material independent of variations in the mass per unit area.

2. The method of claim 1 wherein each of said radiations are generated by beta radiation sources each having different beta emission energy spectra.

3. The method of claim 1 wherein each of said radiations are generated by electromagnetic radiation sources providing different energies of radiation selected from the group consisting of X-rays and gamma rays.

References Cited in the file of this patent
UNITED STATES PATENTS

| | | |
|---|---|---|
| 2,759,108 | Molins | Aug. 14, 1956 |
| 2,883,552 | Faulkner | Apr. 21, 1959 |
| 2,884,535 | Swift | Apr. 28, 1959 |
| 2,886,714 | Ewald | May 12, 1959 |
| 2,889,463 | Linsert | June 2, 1959 |
| 2,920,206 | Heller | Jan. 5, 1960 |
| 2,922,888 | Faulkner et al. | Jan. 26, 1960 |
| 2,979,649 | Leighton | Apr. 11, 1961 |